US010876858B2

(12) United States Patent
Naslund et al.

(10) Patent No.: US 10,876,858 B2
(45) Date of Patent: Dec. 29, 2020

(54) METHOD AND DEVICE FOR LEAK CHECK OF AIR DATA SYSTEM

(71) Applicant: Rosemount Aerospace Inc., Burnsville, MN (US)

(72) Inventors: Brian Brent Naslund, Chanhassen, MN (US); Benjamin John Langemo, Shakopee, MN (US); Matthew Paul Anderson, Burnsville, MN (US); Andrew Sherman, Farmington, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 316 days.

(21) Appl. No.: 16/009,765

(22) Filed: Jun. 15, 2018

(65) Prior Publication Data
US 2019/0383640 A1 Dec. 19, 2019

(51) Int. Cl.
*G01C 25/00* (2006.01)
*G01C 23/00* (2006.01)
*G01M 3/26* (2006.01)

(52) U.S. Cl.
CPC ............. *G01C 25/00* (2013.01); *G01C 23/00* (2013.01); *G01M 3/26* (2013.01)

(58) Field of Classification Search
CPC combination set(s) only.
See application file for complete search history.

(56) References Cited

U.S. PATENT DOCUMENTS

| 3,593,567 A * | 7/1971 | Hartley ................... G01M 3/26 73/40 |
| 4,384,469 A * | 5/1983 | Murphy .............. G01F 25/0007 73/1.29 |
| 5,026,001 A * | 6/1991 | Wright ................... B64F 1/005 150/154 |
| 2008/0250884 A1 | 10/2008 | Braun et al. |
| 2018/0038720 A1 | 2/2018 | Wohlford |

FOREIGN PATENT DOCUMENTS

| CN | 205262673 U | 5/2016 |
| DE | 3230146 A1 | 2/1984 |
| FR | 2656097 A1 | 6/1991 |
| FR | 2993357 A | 1/2014 |

OTHER PUBLICATIONS

Extended European Search Report for EP Application No. 19180664.5, dated Nov. 12, 2019, pp. 5.

* cited by examiner

*Primary Examiner* — Xin Y Zhong
(74) *Attorney, Agent, or Firm* — Kinney & Lange, P.A.

(57) ABSTRACT

A device for use in a leak check test of an air data system includes a device body, an opening extending into the device body with the opening being configured to allow a probe to be at least partially inserted into the opening, and walls surrounding the opening with the walls being situated to seal a port in the probe such that air is prevented from flowing into or out of the port while the probe is inserted into the opening. A method of performing a leak check test includes covering the port with the device to seal the port, heating air within a gas path in the air data system, measuring the change in pressure of the air resulting from an increase in temperature of the air, and determining whether the air data system is sealed depending on the change in pressure of the air.

19 Claims, 2 Drawing Sheets

METHOD AND DEVICE FOR LEAK CHECK OF AIR DATA SYSTEM

FIELD OF THE INVENTION

The present invention relates to air data systems and, in particular, to a method for performing a leak check test and a device for use in a leak check test of the air data system.

BACKGROUND

An air data system is commonly utilized on aircraft to collect data on environmental conditions, and can be utilized to collect other aircraft spatial data. When the air data system is first installed on the aircraft or when a previously installed air data system is repaired, a leak check test is performed to determine if the air data system is sealed such that air can only enter through ports on a probe of the air data system. The test includes introducing pressurized air into the air data system through the ports and comparing the pressure of the air introduced to the pressure measured by sensors in the air data system. This test is time consuming and requires specialized equipment that is costly and bulky.

SUMMARY

A device for use in a leak check test of an air data system includes a device body, an opening extending into the device body with the opening being configured to allow a probe to be at least partially inserted into the opening, and walls surrounding the opening with the walls being situated to seal a port in the probe such that air is prevented from flowing into or out of the port while the probe is inserted into the opening.

A system includes an air data system and a device. The air data system includes a gas path, a probe having at least one port and a heater with the port forming an entrance to the gas path and configured to allow air to enter the gas path, and a transducer having sensors along the gas path. The device is configured to cover at least a portion of the probe during a leak check test of the air data system and includes a device body and an opening extending into the device body with the opening being situated to seal the ports in the probe so that air is prevented from flowing into or out of the ports when the probe is inserted into the opening. A leak check test begins when the device is sealing the ports of the probe with the leak check test instructing the heater to increase the temperature of the air within the gas path and instructing the sensors to measure the change in pressure of the air within the gas path resulting from the change in temperature of the air.

A method of performing a leak check test of an air data system includes the steps of covering a port on a probe of the air data system with a device configured to seal the port to prevent air from entering or exiting the port, heating air within a gas path in the air data system, measuring the change in pressure of the air resulting from an increase in temperature of the air within the gas path, and determining whether the air data system is sealed depending on the change in pressure of the air.

DETAILED DESCRIPTION

A method for performing a leak check test and a device for use in the leak check test of an air data system is disclosed herein. The device includes a body, an opening into which a probe is able to be inserted, and walls surrounding the opening. These walls seal ports in the probe to prevent air from flowing into and out of the ports. The device can also include a proximity sensor, which may be a radio frequency identification ("RFID") tag, configured to interact with and instruct the air data system to begin the leak check test when the probe is inserted into the opening. The leak check test of the air data system includes covering the ports with the device and then heating air within a gas path in the air data system using a heater in the probe. The increase in temperature causes the pressure of the air within the air data system to increase, allowing the leak check test to measure the change in pressure of the air resulting from the increase in the temperature of the air within the gas path. This determines whether the air data system is sealed depending on the change in the pressure of the air. These steps can be performed at different temperatures/pressures. If the increase in pressure of the air is proportional to the increase in temperature of the air within the air data system, the air data system is sealed and has passed the leak check test. If these parameters are not proportional, this departure can indicate a leak or failure of the part. Once the leak check test is complete, the device can be removed from the probe and the air data system can be put into operation. The device can be reused for leak check tests of multiple air data systems.

Figure 1:
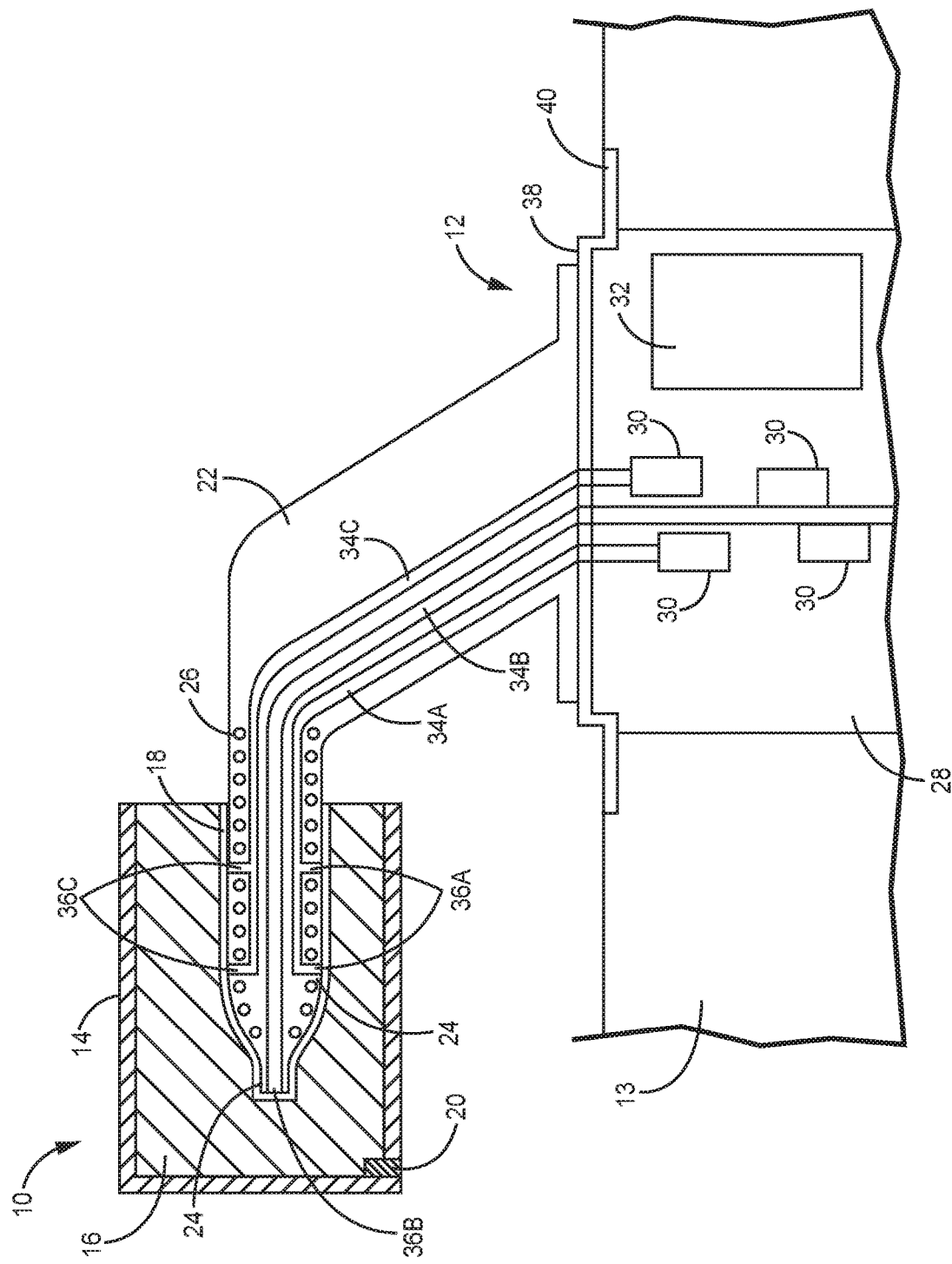
FIG. 1 is a cross-sectional view of a device on an air data system.

FIG. 1 is a cross-sectional view of device 10 on air data system 12, which in turn is on aircraft 13. Device 10 includes body 14, walls 16, opening 18, and proximity sensor 20. Air data system 12 includes probe 22 with ports 24 and heater 26, transducer 28 with sensors 30 and controller 32, gas paths 34A-34C with inlets 36A-36C, and faceplate 38 with flange 40.

Device 10 is configured to be used with air data system 12. In the disclosed embodiments, air data system 12 is utilized on aircraft 13 and can determine environmental conditions as well as other information, such as speed and orientation of aircraft 13. As shown in FIG. 1, transducer 28 is housed within a fuselage of aircraft 13 while probe 22 is outside the fuselage and exposed to environmental conditions. Faceplate 38 can form the interface between probe 22 and transducer 28 to protect transducer 28. While air data system 12 is described in this disclosure as being utilized on aircraft 13, air data system 12 can be utilized anywhere and/or on any vehicle to measure and record environmental conditions and/or collect other information. Further, a data measurement and collection system can include multiple air data systems 12 working together (or having redundant systems), and air data system 12 can interact with and convey information to other systems on aircraft 13, another vehicle/system in which air data system 12 is a part, or to systems remote from air data system 12. Air data system 12 can include other components not expressly described in this disclosure. Further, while this disclosure describes air data system 12 as an integrated system in which probe 22 and transducer 28 are one continuous component, device 10 and the disclosed method of performing a leak check test can be utilized with an air data system that is not integrated, such as a system in which probe 22 and transducer 28 are connected by pneumatic tubing.

Probe 22 is configured to be exposed to the environment and includes components for conveying environmental air to sensors 30 in transducer 28. In FIG. 1, probe 22 is shown with a substantially cylindrical head and an elongated rectangular base. However, probe 22 can have other configurations suitable to convey environmental air to transducer 28. Probe 22 includes ports 24, which form inlets 36A-36C for gas paths 34A-34C that convey environmental air from ports 24 to sensors 30 in transducer 28. The orientation of various ports 24 can be configured to convey different environment air with different pressures to sensors 30. As shown in FIG. 1, probe 22 and air data system 12 include three gas paths: gas path 34A on a downward side of probe 22 configured to convey air from inlets 36A (two ports 24) to one sensor 30, gas path 34B in a middle of probe 22 configured to convey air from inlet 36B (one port 24 at a tip of probe 22) to two sensors 30, and gas path 34C on an upward side of probe 22 configured to convey air from inlets 36C (two ports 24) to one sensor 30. Air data system 12 can include other configurations with more or less gas paths 34 and more or less ports 24. Probe 22 also includes heater 26, which is configured to heat at least the head of probe 22 to prevent ports 24 and gas paths 34A-34C from becoming partially or fully clogged due to ice and/or liquid. Heater 26 can be a coil or another configuration known to one of skill in the art. As shown in FIG. 1, heater 26 is a coil that winds within probe 22 adjacent gas paths 34A-34C. Heater 26 is configured to provide a sufficient amount of heat to increase the temperature of air within gas paths 34A-34C. While only shown as being in a head of probe 22, heater 26 can extend into the base of probe 22.

Transducer 28 is configured to mate with probe 22 such that gas paths 34A-34C are fluidly connected from inlets 36A-36C to at least sensors 30 in transducer 28. Transducer 28 can be located within the fuselage of aircraft 13 and protected from environmental conditions by faceplate 38. Transducer 28 includes multiple sensors 30 situated along gas paths 34A-34C configured to measure data extracted from the air within gas paths 34A-34C. Transducer 28 can include controller 32 (or controller 32 can be a component distinct from transducer 28) or other components configured to begin a leak check test (described below) when device 10 is sealing ports 24. Controller 32 (or other components) can be configured to instruct heater 26 of probe 22 to turn on and increase the temperature of the air within gas paths 34A-34C, and also instruct sensors 30 to measure a change in pressure of the air within gas paths 34A-34C that results from the change in temperature of the air. Depending on the change in temperature of the air and the change in pressure of the air, controller 32 (or other components of transducer 28) can determine if air data system 10 is absent of leaks and is sealed. Transducer 28 and/or controller 32 can include RFID or other wireless capabilities, such as a blue tooth capable device, to send and/or receive information from proximity sensor 20 (which can be an RFID tag), and the information received can be an instruction to begin the leak check test because device 10 is in place sealing/plugging ports 24. Transducer 28 can have other components and/or capabilities not expressly disclosed. While transducer 28 is disclosed herein as including sensors 30, it is understood that a sensor is a type of transducer so air data system 12 can include a configuration in which transducer 28 is one sensor 30 such that transducer 28 is not included in air data system 12 and probe 22 and faceplate 28 attach and seal to sensor 30.

Air data system 12 can include faceplate 38 between probe 22 and transducer 28. Faceplate 38 is exposed to environmental conditions and protects transducer 28 from environmental conditions. Faceplate 38 can be a protective covering with flange 40 that extends outward to provide an attachment surface to the fuselage of aircraft 13.

During installation and/or recalibration of air data system 12, a leak check test must be performed to ensure air data system 12 is sealed (except for ports 24) so that sensors 30 return correct measurements of the environmental air within gas paths 34A-34C. This test is performed in conjunction with device 10.

Device 10 is used in the leak check test of air data system 12. Device 10 can be a cylindrical (or another shaped) sleeve that is configured to be slid onto probe 22 to seal ports 24 of probe 22 to prevent air from flowing into and out of ports 24. In other embodiments, device 10 can be a seal that suctions over ports 30, such as a suction cup. Device 10 can be one continuous and monolithic component, or can be formed from multiple pieces that are fastened together. Device 10 can be constructed from any material suitable to handle environmental conditions (such as rain, snow, etc. that aircraft 13 can experience when parked on the ground) and elevated temperatures that can result from heater 26 heating probe 22 (and air within gas paths 34A-34C) during the leak check test. As disclosed, device 10 is multiple pieces fastened together with body 14 on an outside, walls 16 (surrounding opening 18) being constructed from a heat resistant material, and proximity sensor 20 being insertable or permanently fixed on to or within body 14. While device 10 is shown as being cylindrical in shape, device 10 can have any other shape, size, and/or configuration suitable for accommodating probe 22 to seal ports 24. As disclosed, probe 22 is slid into opening 18, the leak check test is performed, and probe 22 is slid out of opening 18. However, device 10 can have other configurations to seal ports 24, such as device 10 being a flexible membrane that is wrapped around probe 22.

Body 14 of device 10 is an outer casing that provides structural support to the other components of device 10. Body 14 can have any shape but, as shown in FIG. 1, is cylindrical. Body 14 can be one continuous and monolithic component or multiple pieces fastened together. Body 14 can include other features for attachment of other components of device 10 not expressly mentioned in this disclosure. Further, body 14 can include an orifice for insertion (and removal) of proximity sensor 20, and/or body 14 can include another configuration to securely hold proximity sensor 20.

Walls 16 surround and form opening 18 in device 10. Walls 16 and opening 18 are radially within body 14. Walls 16 can be any thickness, including a thickness that spans an entire distance between body 14 and opening 18 (as shown in FIG. 1), or device 10 can have a void (or other components) between body 14 and walls 16 with walls 16 having a smaller thickness. However, walls 16 should have sufficient thickness and/or be made from a heat resistant material to accommodate probe 22 when heater 26 has heated probe 22 to an elevated temperature during the leak check test. Walls 16 should form opening 18 that is sized and shaped to provide a sufficient seal to ports 24 to prevent air from flowing into or out of ports 24 when probe 22 is in place within opening 18. Walls 16 can be configured to seal all ports 24 collectively (i.e., the system is sealed such that air can flow into and out of individual ports 24 but not into or out of device 24) or each port 24 individually (i.e., air cannot flow into or out of each of ports 24). To seal ports 24 collectively, walls 16 may be configured to be in contact with and sealed to probe 22 at an end (a right side of device 10 in FIG. 1) while being a distance from probe 22 at locations within device 10. Alternatively, to seal each of ports 24 individually, walls 16 can be in continuous contact with probe 22 to plug ports 24. Additionally, walls 16 can be made from a flexible material that forms to the shape of probe 22 to provide a sufficient seal (i.e., opening 18 can be flexible such that the size and shape of opening 18 is able to change to accommodate differently shaped probes 22). As shown, with probe 22 being substantially cylindrical, opening 18 is also substantially cylindrical to complement the size and shape of probe 22.

Proximity Sensor 20 is located on or within body 14, and is configured to instruct air data system 12 to begin the leak check test. Proximity Sensor 20 can send the instruction to controller 32 or another component of air data system 12 that has the ability to begin the leak check test. Proximity sensor 20 is configured to send the instruction when device 10 is in place on probe 22 such that probe 22 is within opening 18 with ports 24 being sealed by walls 16. Proximity sensor 20 can be a radio frequency identification ("RFID") tag or another device capable of wireless communication that is active or passive and informs air data system 12 (e.g., controller 32) that proximity sensor 20 (and therefore device 10) is in place and ready for the leak check test to be performed. Proximity sensor 20 can have other configurations and capabilities, and device 10 can have other configurations in which proximity sensor 20 is not present in device 10 and the leak check test is manually started.

Figure 2:
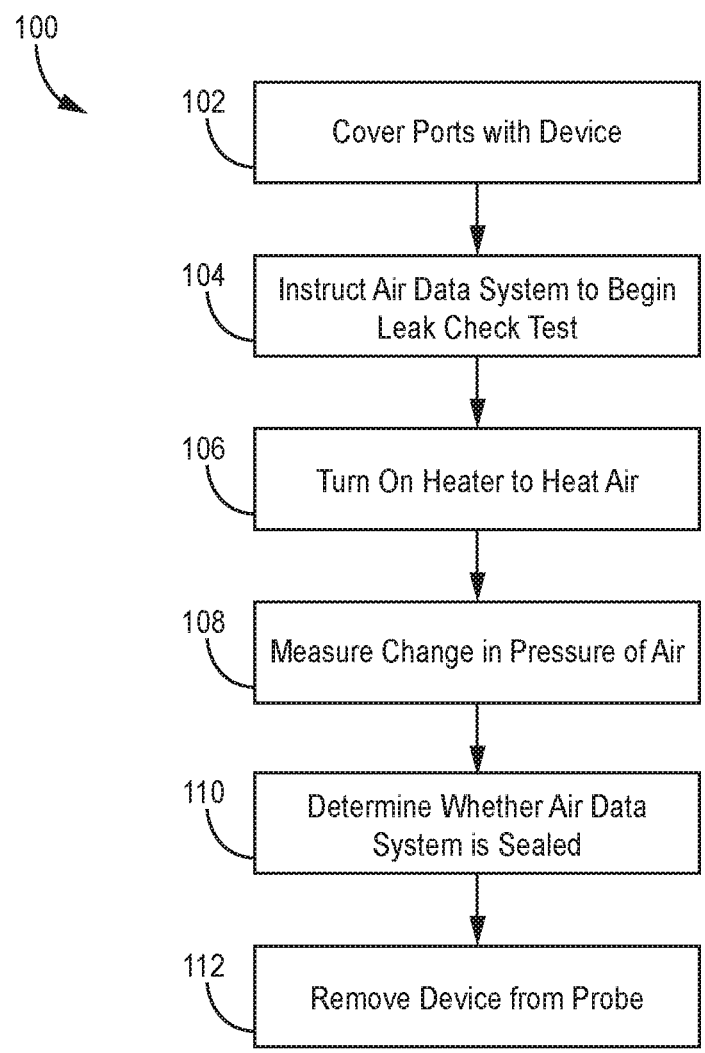
FIG. 2 is a flow chart of a process of performing a leak check test of the air data system.

With the components of device 10 and air data system 12 being described above, the leak check test for which device 10 is designed to be used with is disclosed below. FIG. 2 is a flow chart of a process of performing leak check test 100 of air data system 12 shown in FIG. 1. Leak check test 100 described herein is not exclusive and can include other steps not expressly disclosed.

Leak check test 100 can only be performed when ports 24 of probe 22 are covered/sealed by device 10 (step 102). Because leak check test 100 is dependent upon the amount of air within gas paths 34A-34C remaining constant, ports 24 must be sealed to prevent outside air from entering gas paths 34A-34C and to prevent air within gas paths 34A-34C from exiting probe 22. Thus, to begin leak check test 100, step 102 must be performed so that device 10 is plugging ports 24.

After covering/sealing ports 24, air data system 12 is instructed to begin leak check test 100 (step 104). Step 104 can be performed by proximity sensor 20 informing controller 32 (or another component) that device 10 is in place on probe 22, which in turn informs controller 32 that leak check test 100 can begin. Additionally, step 104 can be performed manually or by another component.

Once instructed to begin leak check test 100, heater 26 in probe 22 of air data system 12 is turned on and begins to heat the air within gas paths 34A-34C (step 106). Because gas paths 34A-34C are each (and collectively) a fixed volume when ports 24 are sealed, heating the air within gas paths 34A-34C causes a change in pressure within gas paths 34A-34C.

As heater 26 is increasing the temperature of the air within gas paths 34A-34C (step 106), sensors 30 can measure the change in air pressure of the air within gas paths 34A-34C (step 108). Step 108 can be performed multiple times as the temperature of the air is increased to collect numerous data points, or step 108 can be performed only once because the volume of each of gas paths 34A-34C is known and, depending on the temperature of the air, the pressure should be proportional to the temperature. Additionally, sensors 30 can also measure the change in air pressure after heater 26 is turned off and air within gas paths 34A-34C is allowed to decrease. As mentioned above, air data system 12 can include multiple gas paths 34A-34C and multiple sensors 30, so step 106 and other steps in leak check test 100 can be performed simultaneously (or one after the other) for multiple gas paths 34A-34C or can be performed only on one gas path individually.

Next, step 110 is determining whether air data system 10 is sealed such that there are no leaks other than at ports 24 (which are plugged/sealed during leak check test 100). When the air within gas paths 34A-34C is heated and gas paths 34A-34C are sealed (i.e., ports 24 are sealed and there are no leaks within air data system 12), the increase in pressure within gas paths 34A-34C will be proportional to the increase in temperature of the air. If there is a leak (i.e., air data system 10 is not sealed), the pressure within gas paths 34A-34C will not increase proportionally to the increase in temperature of the air. Further, if a leak is present, the pressure of the air should decrease over time when the temperature is held constant. Step 110 can be performed manually by looking at a graph or the raw data that compares the temperature of the air to the pressure of the air, or air data system 12 (via controller 32 or another component) can be configured to analyze the data and detect a leak automatically.

Finally, device 10 is removed from probe 22 (step 112). If air data system 12 is determined to be without any leaks in step 110, then air data system 12 is ready for operation after device 10 is removed. If air data system 12 is determined to have leaks in step 110, then air data system 12 should be repaired and/or replaced after device 10 is removed. Device 10 can then be used for leak check test 100 on another air data system 12.

With device 10 being light weight and transportable, leak check test 100 that utilizes device 10 can be performed on aircraft 13 without the need for aircraft 13 to be brought into a maintenance hangar/bay, thus reducing the downtime of aircraft 13 and increasing efficiency. Device 10 does not need to include any air pumps or other components that introduce pressurized air into air data system 12 through ports 24 (or another way) because leak check test 100 uses heater 26 to increase the temperature of the air within air data system 12, which in turn increases the pressure within air data system 10.

Discussion of Possible Embodiments

The following are non-exclusive descriptions of possible embodiments of the present invention.

A device for use in a leak check test of an air data system includes a device body, an opening extending into the device body with the opening being configured to allow a probe to be at least partially inserted into the opening, and walls surrounding the opening with the walls being situated to seal a port in the probe such that air is prevented from flowing into or out of the port while the probe is inserted into the opening.

The device of the preceding paragraph can optionally include, additionally and/or alternatively, any one or more of the following features, configurations, and/or additional components:

A proximity sensor configured to instruct the air data system to begin the leak check test when the probe is inserted into the opening.

The proximity sensor is a tag capable of wireless communication that is configured to instruct a controller of the air data system to begin the leak check test.

The walls are constructed from a heat resistant material.

The walls are configured to seal more than one port in the probe.

The body is cylindrical and the opening is cylindrical to accommodate the probe.

A system includes an air data system and a device. The air data system includes a gas path, a probe having at least one port and a heater with the port forming an entrance to the gas path and configured to allow air to enter the gas path, and a transducer having sensors along the gas path. The device is configured to cover at least a portion of the probe during a leak check test of the air data system and includes a device body and an opening extending into the device body with the opening being situated to seal the ports in the probe so that air is prevented from flowing into or out of the ports when the probe is inserted into the opening. A leak check test begins when the device is sealing the ports of the probe with the leak check test instructing the heater to increase the temperature of the air within the gas path and instructing the sensors to measure the change in pressure of the air within the gas path resulting from the change in temperature of the air.

The system of the preceding paragraph can optionally include, additionally and/or alternatively, any one or more of the following features, configurations, and/or additional components:

The transducer is configured to being the leak check test when the device is sealing the ports of the probe.

The transducer is configured to determine whether the air data system is absent of leaks depending on the change in pressure of the air within the gas path resulting from the change in temperature of the air.

The device further includes a proximity sensor configured to inform the transducer that the device is sealing the ports of the probe.

The proximity sensor of the device is a radio frequency identification tag.

The air data system is on an aircraft with the probe being exposed to the environment and the transducer being within a fuselage of the aircraft.

The device further includes walls surrounding the opening that are configured to seal each port individually.

The walls are constructed from a heat resistant material.

A controller configured to instruct the air data system to begin the leak check test and configured to determine if the air data system is absent of leaks.

A method of performing a leak check test of an air data system includes the steps of covering a port on a probe of the air data system with a device configured to seal the port to prevent air from entering or exiting the port, heating air within a gas path in the air data system, measuring the change in pressure of the air resulting from an increase in temperature of the air within the gas path, and determining whether the air data system is sealed depending on the change in pressure of the air.

The method of the preceding paragraph can optionally include, additionally and/or alternatively, any one or more of the following features, configurations, steps, and/or additional components:

After covering the port on the probe with the device, instructing a heater to heat the air within the gas path with the instruction being performed by a proximity sensor that is part of the device.

The step of measuring the change in pressure of the air within the gas path is repeated multiple times by at least one sensor within the air data system.

Removing the device from the probe after the air data system is determined to be sealed or unsealed.

Measuring the change in pressure of the air within multiple gas paths in the air data system resulting from the increase in temperature of the air within each of the gas paths and determining whether each of the multiple gas paths is sealed depending on the change in pressure of the air.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A device for use in a leak check test of an air data system, the device comprising:
   a body;
   an opening extending into the body, the opening being configured to allow a probe to be at least partially inserted into the opening; and
   walls surrounding the opening, the walls being situated to seal a port in the probe such that air is prevented from flowing into or out of the port while the probe is inserted into the opening.

2. The device of claim 1, further comprising:
   a proximity sensor configured to instruct the air data system to begin the leak check test when the probe is inserted into the opening.

3. The device of claim 2, wherein the proximity sensor is a tag capable of wireless communication that is configured to instruct a controller of the air data system to begin the leak check test.

4. The device of claim 1, wherein the walls are constructed from a heat resistant material.

5. The device of claim 1, wherein the walls are configured to seal more than one port in the probe.

6. The device of claim 1, wherein the body is cylindrical and the opening is cylindrical to accommodate the probe.

7. A system comprising:
   an air data system comprising:
      a gas path;
      a probe having ports and a heater, the ports forming an entrance to the gas path and configured to allow air to enter the gas path; and
      a transducer having sensors situated along the gas path; and
   a device configured to cover at least a portion of the probe during a leak check test of the air data system, the device comprising:
      a device body; and
      an opening extending into the device body with the opening being situated to seal the ports in the probe so that air is prevented from flowing into or out of the ports when the probe is inserted into the opening.

8. The system of claim 7, wherein the transducer is configured to determine whether the air data system is absent of leaks depending on a change in pressure of the air within the gas path resulting from a change in temperature of the air.

9. The system of claim 7, wherein the device further comprises:
a proximity sensor configured to inform the transducer that the device is sealing the ports of the probe.

10. The system of claim 9, wherein the proximity sensor of the device is a radio frequency identification tag.

11. The system of claim 7, wherein the air data system is on an aircraft with the probe being exposed to the environment and the transducer being within a fuselage of the aircraft.

12. The system of claim 7, wherein the device further comprises:
walls surrounding the opening that are configured to seal each port individually.

13. The system of claim 12, wherein the walls are constructed from a heat resistant material.

14. The system of claim 7, further comprising:
a controller configured to instruct the air data system to begin the leak check test and configured to determine if the air data system is absent of leaks.

15. A method of performing a leak check test of an air data system, the method comprising:
covering a port on a probe of the air data system with a device configured to seal the port to prevent air from entering or exiting the port;
heating air within a gas path in the air data system;
measuring a change in pressure of the air resulting from an increase in temperature of the air within the gas path; and
determining whether the air data system is sealed depending on the change in pressure of the air.

16. The method of claim 15, further comprising:
after covering the port on the probe with the device, instructing a heater to heat the air within the gas path with the instruction being performed by a proximity sensor that is part of the device.

17. The method of claim 15, wherein the step of measuring the change in pressure of the air within the gas path is repeated multiple times by at least one sensor within the air data system.

18. The method of claim 15, further comprising:
removing the device from the probe after the air data system is determined to be sealed or unsealed.

19. The method of claim 15, further comprising:
measuring the change in pressure of the air within multiple gas paths in the air data system resulting from the increase in temperature of the air within each of the gas paths; and
determining whether each of the multiple gas paths is sealed depending on the change in pressure of the air.

* * * * *